United States Patent
Debray et al.

(10) Patent No.: US 11,261,756 B2
(45) Date of Patent: Mar. 1, 2022

(54) METHOD FOR MANUFACTURING A TURBOMACHINE EXHAUST CASING FROM SEGMENTS WELDED TOGETHER

(71) Applicant: SAFRAN AIRCRAFT ENGINES, Paris (FR)

(72) Inventors: Benoit Argémiro Matthieu Debray, Moissy-Cramayel (FR); Dominique Michel Fouquet, Moissy-Cramayel (FR); Grégory Ghosarossian-Prillieux, Moissy-Cramayel (FR); Guillaume Sevi, Moissy-Cramayel (FR); Patrick Sultana, Moissy-Cramayel (FR); Guy Vieillefond, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 750 days.

(21) Appl. No.: 16/304,110

(22) PCT Filed: May 22, 2017

(86) PCT No.: PCT/FR2017/051260
§ 371 (c)(1),
(2) Date: Nov. 21, 2018

(87) PCT Pub. No.: WO2017/203151
PCT Pub. Date: Nov. 30, 2017

(65) Prior Publication Data
US 2020/0325796 A1   Oct. 15, 2020

(30) Foreign Application Priority Data
May 26, 2016   (FR) ...................................... 1654735

(51) Int. Cl.
*F01D 25/24* (2006.01)
*B23K 15/00* (2006.01)

(52) U.S. Cl.
CPC ............ *F01D 25/24* (2013.01); *B23K 15/006* (2013.01); *F05D 2230/60* (2013.01); *F05D 2240/14* (2013.01)

(58) Field of Classification Search
CPC .. B23K 15/006; B23K 15/08; B23K 15/0093; B23K 26/0604; B23K 31/02;
(Continued)

(56) References Cited

U.S. PATENT DOCUMENTS

| 3,617,685 A | 11/1971 | Brill-Edwards et al. |
| 2002/0044868 A1 | 4/2002 | Marx et al. |

(Continued)

FOREIGN PATENT DOCUMENTS

FR   2 933 130 A1   1/2010

OTHER PUBLICATIONS

International Search Report dated Sep. 11, 2017, issued in corresponding International Application No. PCT/FR2017/051260, filed May 22, 2017, 6 pages.

*Primary Examiner* — Igor Kershteyn
(74) *Attorney, Agent, or Firm* — Christensen O'Connor Johnson Kindness PLLC

(57) ABSTRACT

A method for manufacturing a casing, for example, an exhaust casing, for a turbomachine. The method generally includes: (a) producing casing sectors, each casing sector having a hub sector, a ferrule sector, and at least one arm linking the hub and ferrule sectors, (b) arranging the casing sectors adjacently and circumferentially, such that each hub sector has longitudinal edges facing longitudinal edges of adjacent hub sectors, (c) welding the longitudinal edges facing the hub sectors, and (d) adding and welding at least a second part of the ferrule to the casing sectors.

7 Claims, 3 Drawing Sheets

(58) Field of Classification Search
CPC .. B23K 2201/01; B23K 26/066; B64D 29/06; F01D 9/044; F01D 25/162; F01D 9/042; F05D 2230/232; B28D 5/0011; H01L 21/78; H01J 37/3053
See application file for complete search history.

(56) References Cited

U.S. PATENT DOCUMENTS

| | | |
|---|---|---|
| 2014/0112772 A1 | 4/2014 | Duval et al. |
| 2015/0143814 A1* | 5/2015 | Orosa ............... F01D 25/30 60/796 |
| 2015/0204212 A1* | 7/2015 | Mountz ............ F01D 21/045 415/144 |
| 2016/0200443 A1* | 7/2016 | Bellabal ........... F01D 25/16 415/213.1 |
| 2018/0030843 A1* | 2/2018 | Damevin ........... F01D 5/141 |
| 2020/0326071 A1* | 10/2020 | Debray ............. B23K 15/006 |

* cited by examiner

METHOD FOR MANUFACTURING A TURBOMACHINE EXHAUST CASING FROM SEGMENTS WELDED TOGETHER

TECHNICAL FIELD

The present invention concerns a method for manufacturing a casing, in particular an aircraft turbomachine exhaust casing.

STATE OF THE ART

The state of the art comprises especially documents US-A1-2002/044868, FR-A1-2 933 130, U.S. Pat. No. 3,617,685 A1 and US-A1-2014/112772.

In a known manner, a turbomachine exhaust casing comprises an inner hub and an outer annular ferrule extending around the hub and an axis of rotation. The ferrule is configured to define, with the hub, an annular flow path for a gas stream and is rigidly linked to the hub by arms, substantially radial with respect to the abovementioned axis.

An exhaust casing is mounted downstream (by reference to the flow of the gases in the turbomachine) of a turbine and the gas stream which passes through the exhaust casing is therefore the combustion gas stream exiting the turbine.

A turbomachine can comprise other similar casings such as an intermediate casing. An intermediate casing is interleaved between a low-pressure compressor and a high-pressure compressor of the turbomachine and is therefore passed through by a low-pressure compressor gas stream and intended to supply the high-pressure compressor.

In the current art, such a casing is manufactured by assembling several parts. The hub is produced from one single cast part and the arms and the ferrule, sectored or not, are returned and fixed on the hub.

However, this manufacturing method cannot always be achieved, in particular for obtaining a large diameter casing. It is not, for example, considerable or too complex and too expensive to achieve manufacturing a cast hub with a diameter of around 1.5 metres.

The present invention proposes a simple, effective and economic solution to this problem.

DESCRIPTION OF THE INVENTION

To this end, the invention proposes a method for manufacturing a casing, in particular an exhaust casing, for a turbomachine, said casing comprising an inner hub with an axis of rotation A, said ferrule being configured to define with the hub, an annular flow path for a gas stream and being rigidly linked to the hub by arms, characterised in that it comprises steps consisting of:

a) producing casing sectors, each casing sector comprising a hub sector, a first ferrule sector and at least one arm linking said hub and ferrule sectors, b) arranging said casing sectors circumferentially next to each other with respect to the axis A, such that each hub sector has longitudinal edges facing longitudinal edges of adjacent hub sectors, and c) welding said longitudinal edges facing said hub sectors.

The invention proposes a new manner to manufacture a casing, in particular an exhaust casing, not by means of an initially one-piece hub, but by a sectored hub, i.e. formed by assembling sectors. Each hub sector is secured to at least one arm, and preferably to one single arm of a ferrule sector. The assembly formed by a hub sector, an arm, and a ferrule sector forms a casing sector, which can be produced from one single cast part. The fact that the arms are already secured to the ferrule sectors is particularly advantageous, as this avoid having to provide welding of the arm on the hub, which is a long and laborious operation and increases the risk of welding defaults and therefore of retouching. This avoids also the risk of rotation of the arms during welding, which can lead to a lesser geometric quality of the casing.

The casing sectors are arranged circumferentially next to each other, such that each hub sector has longitudinal edges facing, and at a low distance from, longitudinal edges of adjacent hub sectors. The longitudinal edges facing the hub sectors are then welded, preferably by electron beam (EB).

The method according to the invention can comprise one or more of the following characteristics or steps, taken by themselves or in combination with each other:

- at least some of the casing sectors present differences, such as circumferential extents of their different ferrule sectors,
- in step b), at least some of said first ferrule sectors have longitudinal edges facing longitudinal edges of first adjacent ferrule sectors,
- in step c), said longitudinal edges facing said first ferrule sectors are welded,
- in step b), at least some of said first ferrule sectors have longitudinal edges at a circumferential distance from longitudinal edges of first adjacent ferrule sectors,
- the method comprises, after step c), an additional step d), consisting of adding and welding second ferrule sectors between said longitudinal edges at a distance from said first ferrule sectors,
- at least some of said first and/or second ferrule sectors are formed from one single part with a tread,
- at least some of said casing sectors have their first ferrule sectors which has a lower circumferential extent to that of their hub sectors,
- the number of casing sectors is equal to the number of arms,
- the casing sector is formed from one single part,
- the casing sectors are obtained by casting, and
- said hub comprises a first annular wall, substantially cylindrical linked to an axial end to a second annular wall, substantially frustoconical, stiffeners extending between the inner surfaces of said first and second walls and extending substantially to the right of radially inner ends of said arms, each hub sector comprising at least one of said stiffeners.

DESCRIPTION OF THE FIGURES

The invention will be better understood and other details, characteristics and advantages of the invention will appear more clearly, upon reading the following description, made as a non-limiting example and in reference to the appended drawings, wherein.

DETAILED DESCRIPTION

Figure 1:
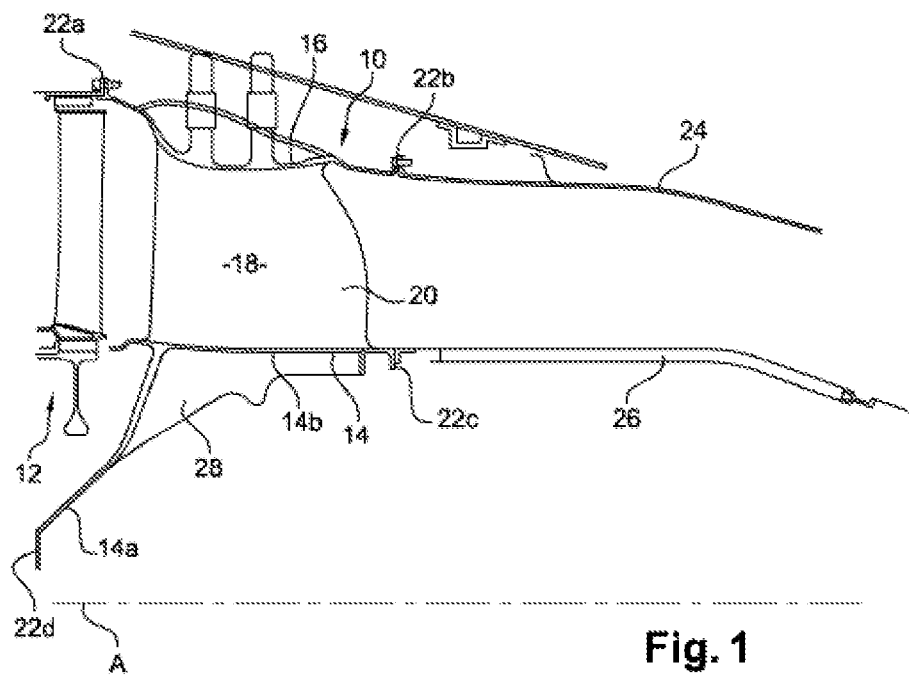
FIG. 1 is a schematic, axial cross-sectional half-view of a downstream turbomachine portion, and shows an exhaust casing.
Figure 2:
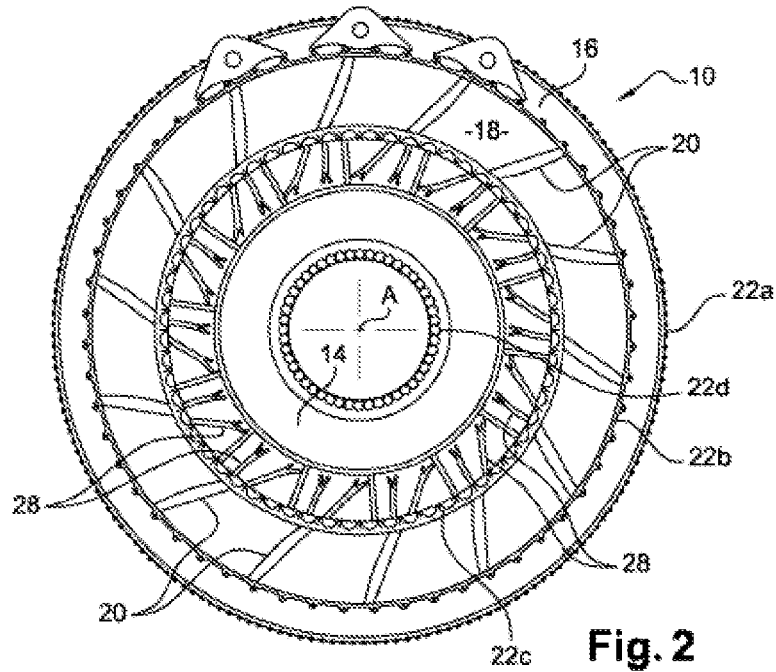
FIG. 2 is a schematic, perspective view of an exhaust casing, front view from the downstream.

FIGS. 1 and 2 represent a casing 10, here an exhaust casing, of an aircraft turbomachine.

Conventionally, a turbomachine comprises a gas generator comprising, from upstream to downstream, in the flow direction of the gas streams, at least one compressor, a combustion chamber, and at least one turbine. Downstream of the turbine 12, is situated the exhaust casing 10 which essentially comprises an inner hub 14 and an outer annular ferrule 16 which extends around the hub and an axis of rotation A which is the longitudinal axis of the turbomachine.

The ferrule 16 and the hub 14 together define an annular flow path 18 for the combustion gases exiting the turbine 12.

The ferrule 16 and the hub 14 are rigidly linked to each other by arms 20, substantially radial with respect to the axis A. The arms 20 can be tilted with respect to the planes passing through the axis A.

The casing 10 comprises flanges 22a-22d for fixing to other elements of the turbomachine. These mounting flanges are situated at the upstream and downstream longitudinal ends of the casing. In the example represented, the ferrule 16 comprises an annular flange 22a, 22b at each of their upstream and downstream longitudinal ends. The upstream flange 22a is fixed to a downstream end of a casing of the turbine 12 and the downstream flange 22b is fixed to an upstream end of an exhaust nozzle 24.

The hub 14 comprises two annular walls, respectively upstream 14a and downstream 14b. The upstream wall 14a is substantially frustoconical (deviating from upstream to downstream) and the downstream wall 14b is substantially cylindrical. This downstream wall 14b comprises, at its downstream end, an annular flange 22c for fixing to an upstream end of an exhaust cone 26 surrounded by the nozzle 24.

The upstream wall 14a bears at its upstream end, a flange 22d for fixing to a bearing support.

The radially inner surfaces of the walls 14a, 14b of the hub are linked to each other by stiffeners 28, here formed by grooves. As is best visible in FIG. 2, two stiffeners 28 extend substantially to the right of the radially inner end of each arm 20, in the radial extension of this arm.

In the prior art, the casing 10 is manufactured by adding and by fixing the ferrule 16 and the arms 18 on a hub 14 which is one-piece and produced from one single part, generally by casting.

FIGS. 3 to 6 illustrate an embodiment of the invention which especially consists of assembling casing sectors and in particular, hub sectors.

Figure 3:
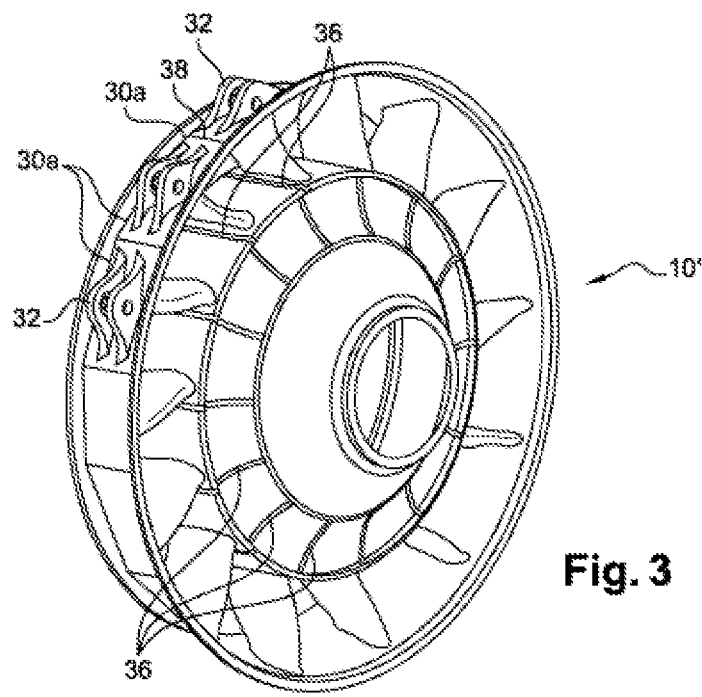
FIG. 3 is a schematic, perspective view of an exhaust casing according to the invention, side view from the upstream.
Figure 4:
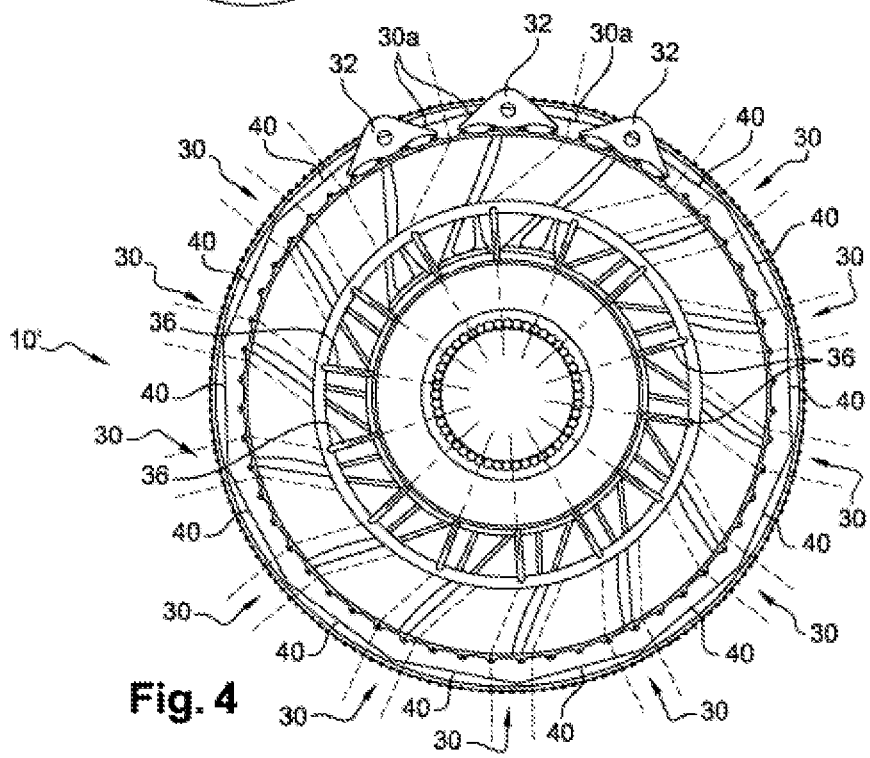
FIG. 4 is a schematic, perspective view of the exhaust casing of FIG. 3, front view from downstream.
Figure 5:
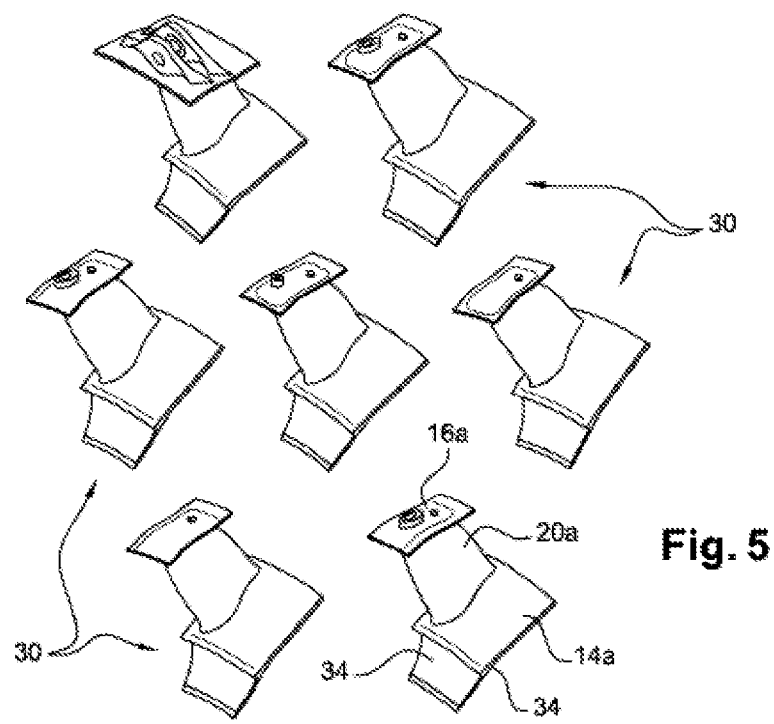
FIG. 5 is a schematic, perspective view of casing sectors of the exhaust casing of FIG. 3.
Figure 6:
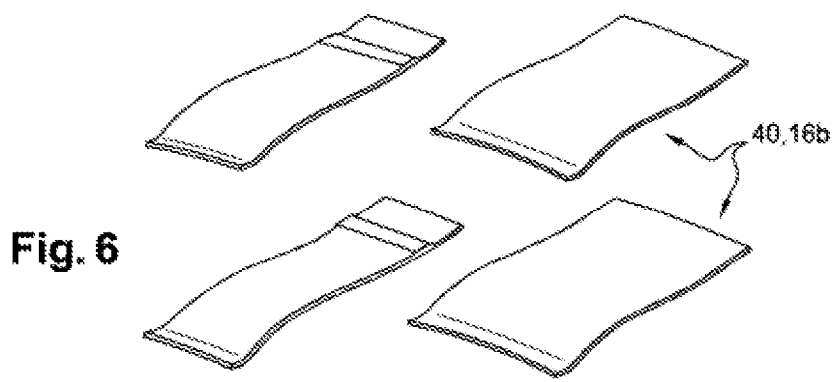
FIG. 6 is a schematic, perspective view of ferrule sectors of the exhaust casing of FIG. 3.

FIGS. 3 and 4 show an assembled casing 10' according to the invention, and FIGS. 5 and 6 show the elements of this casing 10'.

The casing 10' is produced from casing sectors 30 which are represented in FIG. 5. Here, they are of seven types, all different. These seven types are in fact the seven references of casing sectors of the casing 10'. In other words, the casing 10 can be obtained from one or more copies of each reference or type of FIG. 5.

In the example represented, the casing 10' comprises fourteen casing sectors 30. As an example, the casing comprises three casing sectors referenced 30a. As will be seen below, these casing sectors 30a are different from each other, by the fact that they comprise treads 32.

Each casing sector 30 comprises a hub sector 14a, a ferrule sector 16a and at least one arm 20a linking the hub and ferrule sectors (FIG. 5). In the example represented, each casing sector 30 comprises one single arm 20a. Each hub sector 14a can comprise one or more of the stiffeners 28 on its radially inner surface, as stated in the above (FIG. 4).

It is thus understood, that the number of casing sectors 30 here is equal to the number of arms 20a, namely fourteen in the example represented.

Each casing sector 30 is preferably produced by casting, independently from the other casing sectors 30. The casing sectors 30a are, in this case, produced from one single cast part with their treads 32, which are each situated on a radially outer surface of a ferrule sector 16a.

The method according to the invention firstly consists of arranging casing sectors 30 circumferentially next to each other, such that each hub sector 14a has longitudinal edges 34 facing, and at a low circumferential distance, from longitudinal edges of adjacent hub sectors 14a, and welding these longitudinal edges facing the hub sectors (FIG. 5). Thus, weld beads 36 are obtained, extending along the longitudinal edges of the casing sectors 30 (FIGS. 3 and 4).

It is observed in the example represented, that certain casing sectors 30 have their ferrule sectors 16a which have circumferential extents (angular extents) lower than those of the hub sectors 14a of these casing sectors. This is not the case for all casing sectors.

The casing sectors 30a equipped with treads 32 have their ferrule sectors 16a which have circumferential dimensions such as their adjacent longitudinal edges 36 are facing and close to each other and can be welded to each other. Thus, weld beads 38 are obtained, extending along the longitudinal edges of the ferrule sectors 16a (FIG. 3).

The other casing sectors 30 have their ferrule sectors 16a whose longitudinal edges are separated by circumferential spaces of the longitudinal edges of the ferrule sectors of the other casing sectors. These circumferential spaces are filled with panels 40 forming other ferrule sectors 16b, which are added between two ferrule sectors 16a belonging to the casing sectors 30 (FIGS. 4 and 6). The panels 40 make it possible, during assembly, to recover/adjust a certain number of geometric defects which could be present on the casing sectors 30, in particular when they are obtained by casting.

In the example represented, the casing 10' comprises twelve panels 40 of four different types or references, represented in FIG. 6. The references differ from each other by their circumferential extent especially also by their thickness (the thickness of a panel which could not be constant). They therefore depend on the abovementioned circumferential spaces to be filled.

FIG. 4 makes it possible to see the different elements composing the casing 10', these different elements being separated by a dotted line. The welding of the longitudinal edges of the hub sectors 14a and of the ferrule sectors 16a, 16b can be realised by the EB welding technique. The weld beads 36, 38 and 40 separate the different elements of the casing 10', as stated above.

The invention makes it possible to significantly simplify the manufacturing of a casing with arms such as an exhaust casing, as the manufacturing of one single part of each casing sector, for example by casting, is simpler to do than the manufacturing of one single part of a large diameter hub.

The invention claimed is:

1. A method for manufacturing an casing (10') for a turbomachine, the casing having an inner hub and an outer annular ferrule extending around the inner hub about an axis of rotation, the ferrule rigidly linked to the hub by arms and configured to define, with the inner hub, an annular flow path for a gas stream the method comprising:

(a) producing casing sectors, wherein each casing sector comprises a hub sector , a first ferrule sector, and at least one arm linking the hub and ferrule sectors;

(b) arranging the casing sectors adjacently and circumferentially with respect to the axis, such that each hub sector has longitudinal edges (34) facing longitudinal edges of adjacent hub sectors;

c) welding the longitudinal edges facing the hub sectors, wherein, in step (b), at least some of the first ferrule sectors have longitudinal edges at a circumferential distance of longitudinal edges of first adjacent ferrule sectors; and (d) adding and welding second ferrule sectors between the longitudinal edges at a distance from the first ferrule sectors.

2. The method of claim 1, wherein, in step (b), at least some of the first ferrule sectors have longitudinal edges facing longitudinal edges of first adjacent ferrule sectors, and, in step (c), the longitudinal edges facing the first ferrule sectors are welded.

3. The method of claim 1, wherein at least some of the first ferrule sectors, some of the second ferrule sectors, or some of the first and second ferrule sectors are formed form one single part with a tread.

4. The method of claim 1, wherein at least some of the casing sectors have first ferrule sectors having a circumferential extent less than that of the corresponding hub sectors.

5. The method of claim 1, wherein the number of casing sectors is equal to the number of arms.

6. The method of claim 1, wherein the casing sectors are manufactured by casting.

7. The method of claim 1, wherein the inner hub comprises: a first substantially cylindrical annular wall linked at an axial end to a second substantially frustoconical annular wall; and stiffeners extending between the lower surfaces of the first and second annular walls, the stiffeners extending substantially to the right of radially inner ends of the arms, wherein each hub sector comprises at least one stiffener.

* * * * *